C. H. JOHNSON.
Apparatus for Making Ozone.
No. 135,226.  Patented Jan. 28, 1873.
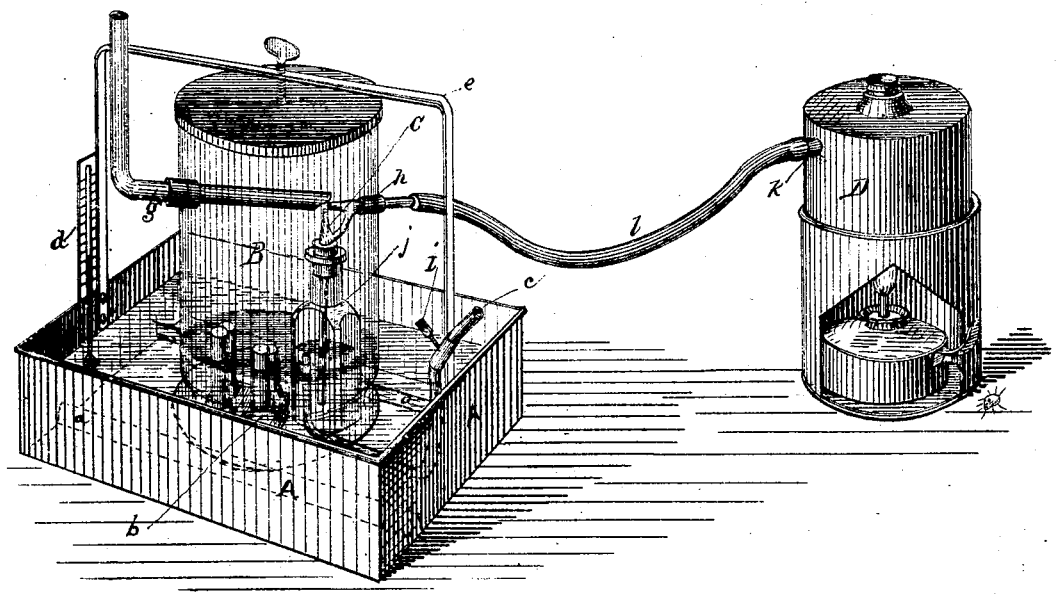

UNITED STATES PATENT OFFICE.

CHARLES H. JOHNSON, OF NEW BRIGHTON, PENNSYLVANIA.

IMPROVEMENT IN APPARATUS FOR MAKING OZONE.

Specification forming part of Letters Patent No. 135,226, dated January 28, 1873.

*To all whom it may concern:*

Be it known that I, CHARLES H. JOHNSON, of New Brighton, in the county of Beaver and State of Pennsylvania, have invented a Machine for Producing Ozone, of which the following is a specification:

My invention is for the production and application of pure ozone. It has been called by still other names; but chemical tests, by means of what are called ozonoscopes, show pretty conclusively that these names refer to the same element. This principle, under varying names, is now recognized as a constituent element of the atmosphere, varying in quantity in different localities, and exercising an important agency in the economy of nature. A certain per cent. of this element is indispensable to a healthful atmosphere, and any marked deficiency of it in the air in any locality seems to invite and bring cholera and other fearful evils. During several years past the nature and composition of this principle or element have engaged the attention of scientific men, both in this country and in Europe. It has been recognized as a powerful agent and capable of great good if properly understood and rightly applied. Strenuous and persevering efforts have been made to discover or invent means by which it might be applied to sanitary and other useful purposes. It possesses wonderful properties for producing and preserving a pure and healthful atmosphere in dwellings, in crowded audience-rooms, in railroad-cars, in hospitals, in ships, in coal-mines, or in any confined and illy-ventilated inclosure. It is also capable of being employed with great advantage for preserving meats for transportation, for bleaching, and for other and varied useful purposes.

Several methods have been employed for the artificial production of ozone. It has been generated by means of electricity, by phosphorus, and by still other means. The method employed in my invention for generating ozone is by the slow combustion of phosphorus. Phosphorus has been long known and frequently employed as a means of producing ozone. Hence no priority of discovery can be claimed in the material used to generate ozone. But in using phosphorus for this purpose, phosphoric acid and other injurious gases are formed with the ozone, rendering it dangerous and altogether unfit for use unless these can be eliminated.

My instrument is so constructed as to facilitate the rapid production of ozone, and at the same time, by means of an alkali, through chemical action, and by the agency of steam, to completely eliminate and neutralize all the injurious acid gases formed simultaneously with the ozone, leaving the ozone perfectly pure and ready to be applied to the useful and valuable purposes for which it is adapted.

The Machine or Invention Described.

The accompanying drawing represents the machine or invention.

A is a zinc pan, two or three inches deep, having two parallel bars, $a\ a$, about one-half inch high and three or four inches apart, and running across the bottom of the pan. The pan A must be filled with water somewhat above the top of the bars $a\ a$. B is an inverted glass jar, or wood or metal lined with glass or porcelain, set on the parallel bars $a\ a$ in the pan A in such a position that the mouth of the jar B is below the surface of the water, but does not rest upon the bottom of the pan. Under the mouth of the jar B is a small zinc plate, with small circular opening or thimbles on its upper surface, in which can be placed sticks of phosphorus standing upright in such a position that they are partly in and partly out of the water. The curved glass tube $c$ passes from the outside along the bottom of the pan A under the bar B and curves upward, leaving the open end within the jar B and above the surface of the water. The outer end of this glass tube $c$ is inclosed in a rubber tube, which passes up the side of the pan A above the surface of the water, and contains a stop-cock, $i$. A thermometer, $d$, stands upright in the pan A. A cross-bar, $e$, runs directly above the jar B, so attached to the pan A as to turn down to one side when required, and having a thumb-screw directly over the jar B for fastening it securely to its place. The large glass tube $g$ is curved upward at the outer end and passes through a hole in the side of the jar B near the top, and runs nearly horizontally across (a little downward) to near the point $h$ on the opposite side of the jar. Near the point $h$ there is a small hole in the jar B directly in front of the open end of tube $g$ inside the jar. C is a triangular glass atomizer, the horizontal arm of which passes through the hole in the jar B near the point $h$, while the perpendicular arm of the atomizer passes downward into a bottle, *j*, containing an alkaline solution and standing within the jar B. This brings the point of the atomizer near and directly in front of the tube *g* within the jar B. D is a closed boiler containing water, so placed with its holder that a lamp or other means of heating can be applied to it underneath. A small tube, *k*, comes out of the side of the boiler D near the top. A rubber tube, *l*, runs from the tube *k* and connects with the horizontal arm of the atomizer C.

Working of the Machine Described.

Place the phosphorus under the jar B in the position hereinbefore described. Ozone soon begins to be formed by the action of the air and water on the phosphorus; but a constant supply of fresh air is needed within the jar B. To supply this the stop-cock *i* must be opened and regulated so as to furnish through the air-tube *c* the amount of air needed. The temperature of the water in the pan A and under the jar B is indicated by the thermometer *d* placed as hereinbefore described. To reduce the temperature, if desired, ice can be placed around the jar B in the pan A.

In putting the instrument into operation, the water must be made to boil in the boiler D. As the water begins to boil the steam passes out of the boiler D through the tube *l*, and through the horizontal arm of the atomizer C. At the point of the atomizer the steam passes over the open end of the perpendicular arm of the atomizer with such force as to draw the alkaline solution from the bottle *j* and divide it into fine spray and force it into and through the tube *g*, the open end of which is directly in front of the point of the atomizer C.

To produce the result as described, the amount and force of the steam generated and forced through the tube and atomizer must be graduated to the size of the atomizer employed. The larger the atomizer used the greater the steam-power required to atomize the alkaline solution. By the means just described a strong current is formed upward from the jar B into and through the tube *g*. The ozone and the injurious acid gases simultaneously formed rush to the open end of the tube *g*, and there meet the steam and the alkaline spray, and are forced with them through the tube *g*. The heat of the steam and the atomized state of the alkali furnish the most favorable conditions for rapid chemical action, rendering it impossible that any phosphoric or other injurious acid gases should pass through the tube *g* without combining with the alkali, and thus be neutralized.

If occasion requires, two, three, or more atomizers can be employed, and can be concentrated at the same point, or at different points, the number of the tubes *g g* being correspondingly increased, thus increasing the amount of the alkaline spray brought into contact with the injurious gases passing upward from the jar B. In this case the capacity of the boiler D must be correspondingly increased. The strength of the alkaline solution can be increased or varied at will.

The rapidity with which ozone is generated and purified can be increased and regulated at pleasure by varying the amount of the material used and the force of the steam-power employed.

A different form of atomizer from the one described can be employed, if desired, bringing the bottle *j* on the outside of the jar B instead of within, as hereinbefore described.

I claim—

1. The pan A and the jar B with tube *g*, and tube *c* with stop-cock *i*, and the combination of the boiler D with the atomizer C, (the boiler D containing water, and having heat applied for boiling,) and the combination of both the boiler D and the atomizer C with the jar B and pan A, for the rapid production of ozone from phosphorus placed under jar B, partly in water, by producing a rapid current of air through the jar B and an increase of temperature within the jar, both favoring the rapid production of ozone from the phosphorus.

2. The pan A and the jar B with tube *g*, and tube *c* having stop-cock *i*, and the bottle *j* containing an alkaline solution, and the combination of the boiler D with the atomizer C, (the boiler D containing water and having heat applied for boiling, and being connected with the atomizer C by the tube *l*,) and the combination of both the boiler D and the atomizer C with the jar B, and with the bottle *j* containing an alkali in solution, for the purifying of ozone by bringing the alkali in a heated and atomized state into intimate contact with the ozone and acid gases passing upward from the phosphorus under jar B, eliminating the acid-gases by chemical action and leaving the ozone pure, in the manner hereinbefore fully set forth.

3. The jar B with tube *g*, and tube *c* with stop-cock *i*, the combination of the boiler D and atomizer C with each other and with the jar B, (the boiler D containing water and having heat applied for boiling, and being connected with the atomizer C by the tube *l*,) for expelling ozone formed from the phosphorus under jar B by producing a rapid current upward through the jar B, and outward through the tube *g*, by the means and in the manner hereinbefore fully set forth.

4. The construction of the apparatus as a whole, consisting of the pan A with its parallel bars *a a*, zinc plate *b*, curved tube *c* with stop-cock *i*, the jar B with horizontal tube *g*, and the atomizer C, bottle *j*, boiler D with tube *l*, the cross-bar *e* with thumb-screw over the jar B, all combined and arranged in the manner and for the purpose hereinbefore fully set forth.

CHARLES H. JOHNSON.

Witnesses:
JOHN McCARTY,
JOHN McGAHEY.